US 7,162,431 B2

(12) United States Patent
Guerra

(10) Patent No.: US 7,162,431 B2
(45) Date of Patent: Jan. 9, 2007

(54) EDUCATIONAL INSTITUTION SELECTION SYSTEM AND METHOD

(75) Inventor: Anthony J. Guerra, Hartsdale, NY (US)

(73) Assignee: Turning Point for Life, Inc., Hartsdale, NY (US)

( * ) Notice: Subject to any disclaimer, the term of this patent is extended or adjusted under 35 U.S.C. 154(b) by 330 days.

(21) Appl. No.: 10/704,763

(22) Filed: Nov. 12, 2003

(65) Prior Publication Data

US 2004/0138913 A1    Jul. 15, 2004

Related U.S. Application Data

(60) Provisional application No. 60/425,261, filed on Nov. 12, 2002.

(51) Int. Cl.
    *G06Q 99/00* (2006.01)
(52) U.S. Cl. ........................................................ 705/1
(58) Field of Classification Search .................. 705/1; 434/219–238
    See application file for complete search history.

(56) References Cited

U.S. PATENT DOCUMENTS

| 6,345,278 | B1 | 2/2002 | Hitchcock et al. |
| 6,347,333 | B1 | 2/2002 | Eisendrath et al. |
| 2001/0025261 | A1 | 9/2001 | Olefson |
| 2001/0049692 | A1 | 12/2001 | Callaghan et al. |
| 2002/0016791 | A1 | 2/2002 | Palmer |
| 2002/0023095 | A1 | 2/2002 | Baba et al. |
| 2002/0028426 | A1* | 3/2002 | Pasant .................. 434/118 |
| 2002/0040301 | A1 | 4/2002 | Royall et al. |
| 2002/0107849 | A1 | 8/2002 | Hickey et al. |
| 2002/0143789 | A1 | 10/2002 | Scoggins |
| 2002/0161719 | A1 | 10/2002 | Manning et al. |
| 2002/0174123 | A1 | 11/2002 | Harbaugh |

FOREIGN PATENT DOCUMENTS

| JP | 02-251493 | 10/1990 |
| JP | 2001-125922 | 5/2001 |
| JP | 2002-157349 | 5/2002 |
| JP | 2002-342466 | 11/2002 |

OTHER PUBLICATIONS www.petersons.com; retrieved from archive.org; any linkage Jun. 19, 2000.*
Business Wire; Peterson's forms alliance with makint it count to help sutdnets make informed college planning decisions.; Nov. 20, 2000.*
PR Newswire; Peterson's & TIME Magazine team up to deliver compelling content to High Schools tudents for college planning and career exploration.; Oct. 8, 2001.*
US News and World Report; Best National Universities; The top 50 Public National Universities; Key Criteria in Judging Schools.; Sep. 11, 2001.*

(Continued)

*Primary Examiner*—John G. Weiss
*Assistant Examiner*—Traci L. Smith
(74) *Attorney, Agent, or Firm*—David L. May; Carlos R. Villamar; Nixon Peabody, LLP

(57) ABSTRACT

A system, method, and computer program product for selecting an educational institution, including determining selection criteria for an educational institution, including a location of the educational institution, a type and size of the educational institution, and an admission selectivity of the educational institution; and generating a list of one or more recommended schools satisfying the selection criteria, wherein the recommended schools satisfy predetermined freshman retention rates and graduation rates.

14 Claims, 11 Drawing Sheets

OTHER PUBLICATIONS

PR Newswire; Thomas Learning Introduces QuickStart Counselor to assisst students with education decsions.; Sep. 26, 2000.☐☐.*

PR Newswire; Internet's most comprehensive Business School Guide Helps Prospective Students fint the right program.; Oct. 13, 1998.*

"Understanding the Rankings" US News and World Report; Oct. 10, 1988 ; Bauer.*

Colleges for specific needs: students of business, engineering, the arts and the military can call these schools their own.(Specialty Schools; American's Best Colleges Special Report). US News and World Report Oct. 16, 1989.*

What's behind the rankings; top students, a first-class faculty and a sterling reputation are just a few of the things America's best colleges are made of.(America's Best Colleges Special Report).* www.petersons.com; retrieved any linkage Jun. 19, 2000.*

* cited by examiner

These are the general My College Finder standards for selectivity, although we apply them in a context-sensitive way by region and state. GPA refers to high school grade point average. Freshman drop-out rate includes student transfers to other schools after the first year.

 Most selective: GPA=3.6-4.0; SAT=1300-1600; ACT=27-36; freshman drop-out rate=10% or less; graduation rate=70% or more

 Very selective: GPA=3.1-3.5; SAT=1100-1300; ACT=24-26; freshman drop-out rate=15% or less; graduation rate=60% or more

 Selective: GPA=2.5-3.0; SAT=1000-1100; ACT=21-23; freshman drop-out rate=25% or less; graduation rate=55% or more

 Less selective: GPA=below 2.5; SAT=below 1000; ACT=below 21; freshman drop-out rate=30% or less; graduation rate=50% or more

Index of Sets of Schools in My College Finder

National      Pages
Top 21 Public Institutions      1
Top 21 Private Institutions      4

Northeast
Northeast, Research Universities, Most Selective      704      7
Northeast, Research Universities, Very Selective      9
Northeast, Research Universities, Selective      11
Northeast, Research Universities, Less Selective      706      13
Northeast, Small/Medium Universities, Most Selective      15
Northeast, Small/Medium Universities, Very Selective      16
Northeast, Small/Medium Universities, Selective      708      18
Northeast, Small/Medium Universities, Less Selective      21
Northeast, Liberal Arts Colleges, Most Selective      702      24
Northeast, Liberal Arts Colleges, Very Selective      26
Northeast, Liberal Arts Colleges, Selective      29
Northeast, Liberal Arts Colleges, Less Selective      32

South
South, Research Universities, Most Selective      35
South, Research Universities, Very Selective      37
South, Research Universities, Selective      39
South, Research Universities, Less Selective      42
South, Small/Medium Universities, Most Selective      44
South, Small/Medium Universities, Very Selective      46
South, Small/Medium Universities, Selective      48
South, Small/Medium Universities, Less Selective      50
South, Liberal Arts Colleges, Most Selective      53
South, Liberal Arts Colleges, Very Selective      55
South, Liberal Arts Colleges, Selective      58
South, Liberal Arts Colleges, Less Selective      61

West
West, Research Universities, Most Selective      63
West, Research Universities, Very Selective      64
West, Research Universities, Selective      66
West, Research Universities, Less Selective      69
West, Small/Medium Universities, Most Selective      71
West, Small/Medium Universities, Very Selective      73

Northeast, Small/Medium Universities, Very Selective

Yes Maybe No

Northeast, Small/Medium Universities, Very Selective — 706

Massachusetts — 810

Brandeis University  www.brandeis.edu — 804
Shapiro Admissions Center, MS 003, Waltham, MA 02454-9110
Phone: (781) 736-3500  Toll Free: (800) 622-0622  Private ☐ ☐ ☐
 — 806
Connecticut — 808  812

Fairfield University  www.fairfield.edu  814
Office of Admissions, 1073 North Benson Road, Fairfield, CT 06430-5195
Phone: (203) 254-4100  Private ☐ ☐ ☐

New York

Clarkson University  www.clarkson.edu
Holcroft House, P.O. Box 5605, Potsdam, NY 13699-5605
Phone: (315) 268-6480  Toll Free: (800) 527-6577  Private ☐ ☐ ☐

Ithaca College  www.ithaca.edu
100 Job Hall, Ithaca, NY 14850-7020
Phone: (607) 274-3124  Toll Free: (800) 429-4274  Private ☐ ☐ ☐

Marist College  www.marist.edu
3399 North Road, Poughkeepsie, NY 12601-1387
Phone: (845) 575-3226  Toll Free: (800) 436-5483  Private ☐ ☐ ☐

State University of New York College at  www.geneseo.edu
Geneseo
Office of Admissions, 1 College Circle, Geneseo, NY 14454
Phone: (716) 245-5571  Public ☐ ☐ ☐

New Jersey

Drew University  www.drew.edu
Office of Admissions, 36 Madison Avenue, Madison, NJ 07940-1493
Phone: (973) 408-3739  Private ☐ ☐ ☐

Richard Stockton College of New Jersey  www.stockton.edu
P.O. Box 195, Pomona, NJ 08240
Phone: (609) 652-1776  Public ☐ ☐ ☐

708 — 16

800

EDUCATIONAL INSTITUTION SELECTION SYSTEM AND METHOD

CROSS REFERENCE TO RELATED DOCUMENTS

The present invention claims benefit of priority to commonly assigned, U.S. Provisional Patent Application Ser. No. 60/425,261 of Guerra, entitled "EDUCATIONAL INSTITUTION SELECTION SYSTEM," filed Nov. 12, 2002, the entire disclosure of which is hereby incorporated by reference herein.

BACKGROUND OF THE INVENTION

1. Field of the Invention

The present invention generally relates to methods and systems for educational institution admissions counseling, and more particularly to a method and system for educational institution selection.

2. Discussion of the Background

When it comes time to look for educational institutions, students and their parents are often at a loss of what to do. Many parents will go out and buy their child a 2,000 page book profiling over 3,000 schools. Such guidebooks provide information about included schools, but the number of choices is overwhelming and there is no clear direction on how to gain a list of schools that are best for the student. Some parents may pay for their child to get private college admissions counseling, which can be very helpful, but typically is only available to families that can afford to pay the many thousands of dollars that these services often can cost. Some students may take the initiative to meet with their guidance counselors at school, and who often are overseeing too many students to give a substantial amount of time in helping students find the right schools.

There are numerous books and websites that can help students narrow their college choices. For example, in his book, My College Finder, Dr. Steven Antonoff has created lists of schools according to topics. For example, there are lists of schools under topics, such as "Colleges that admit many students early," or "Colleges with excellent theater programs." Dr. Antonoff gives the example of a student with average grades who desires a Catholic college with a good tennis team. Dr. Antonoff states that this student could look at the different lists under these categories and find schools that are mentioned in each of the lists. However, the problem with this approach is that a student may choose factors that bear very little on the experience the student will have at a chosen school. If the student makes a decision to go to such a Catholic school with the good tennis team, but finds that the size of the school is overwhelming or the student is getting homesick from being too far away from home, the student will not have a positive experience in college.

There are several websites that generate lists of schools according to preferences entered by students. For example, at embark.com, which recently merged with the Princeton Review, a student is asked to answer approximately seventeen questions. Some examples of the questions asked are: "What annual out-of-state tuition levels are you interested in?" "Are you interested in schools based on the percentage of undergraduates who receive financial aid?" "What percentage of applicants accepted interests you?" "Are you interested in schools based on the racial and ethnic diversity of the student body?" "What activities interest you?" "How important to you is a fraternity or sorority presence on campus?" Similarly, at petersons.com, students are asked about ten questions, including questions, such as their preference for faculty/student ratio and religious denomination.

However, such surveys can be cumbersome and time-consuming. Also, the sheer number of questions is often confusing, as typically there is no prioritizing of the many questions asked of the student. Another serious flaw of these systems is the resulting list of schools that are generated. For example, the lists are random in total number, ranging from zero to several hundred or even a few thousand colleges.

Another flaw in the above-mentioned programs is that typically they do not provide a systematic method of screening out unreliable schools. For example, the college selection program at embark.com typically is the only one that asks what level of freshman retention rates a student would prefer. However, the problem is that the student is left unguided as to an appropriate retention rate for schools at various levels of competitiveness. In addition, leaving such decisions to the uninstructed preference of students can lead to unreliable and often random results.

SUMMARY OF THE INVENTION

Therefore, there is a need for a system and method that directs students to look at factors that will have the greatest impact on their experience in college. There also is a need for a system and method that is simple to use, time efficient, and that generates a list with a reasonable number of recommended schools (e.g., between six and twenty schools) for the student to consider. There further is a need for a college selection system and method to set standards of freshman retention rates based on a comprehensive review of the norms and averages of retention rates at colleges throughout a country, such as the United States.

The above and other needs are addressed by the exemplary embodiments of the present invention, which provide a system and method for selection of an educational institution, including a student choosing a preferable region for the educational institution, choosing a preference for type and size of the educational institution, and choosing a selectivity level that is most appropriate to the grades and test scores of the student. An index that is provided lists the groupings of educational institutions that satisfy the specified criteria according to one or more states in the selected region. Advantageously, the educational institution selection system and method of the exemplary embodiments provides a simple and yet profoundly effective and economical system and method for identifying lists of potential schools of interest, for example, by focusing a student on important factors in choosing schools, and then generating a list of schools that fit such criteria and that have a proven record of helping students succeed.

Accordingly, in exemplary aspects of the present invention, a system, method, and computer program product for selecting an educational institution are provided. The system, method, and computer program product include determining selection criteria for an educational institution, including a location of the educational institution, a type and size of the educational institution, and an admission selectivity of the educational institution; and generating a list of one or more recommended schools satisfying the selection criteria, wherein the recommended schools satisfy predetermined freshman retention rates and graduation rates.

Still other aspects, features, and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIG. 6 illustrates selectivity levels and grade point average (GPA) and scholastic assessment test (SAT) ranges associated with each level, including screening standards used for each selectivity level in terms of percentages of freshman retention and students graduating, according to an exemplary embodiment;

FIG. 7 illustrates a portion of an index listing possible combinations of selection factors for educational institutions, according to an exemplary embodiment;

FIG. 8 illustrates detailed information for educational institutions corresponding to the possible combinations of selection factors of FIG. 7, according to an exemplary embodiment;

DETAILED DESCRIPTION OF THE PREFERRED EMBODIMENTS

Figure 1:
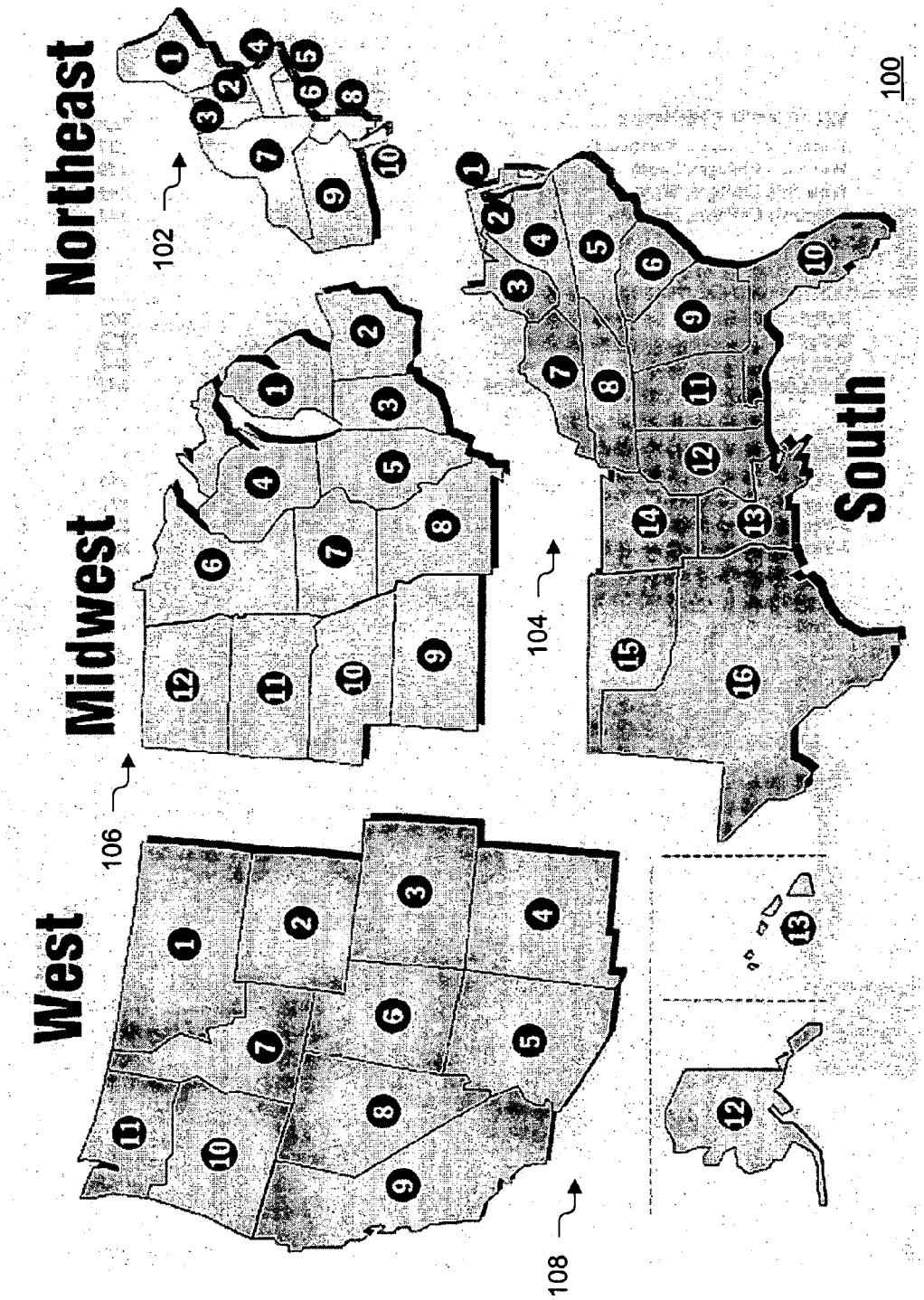
FIG. 1 is a map illustrating the United States of America divided into four regions, according to an exemplary embodiment.
Figure 2:
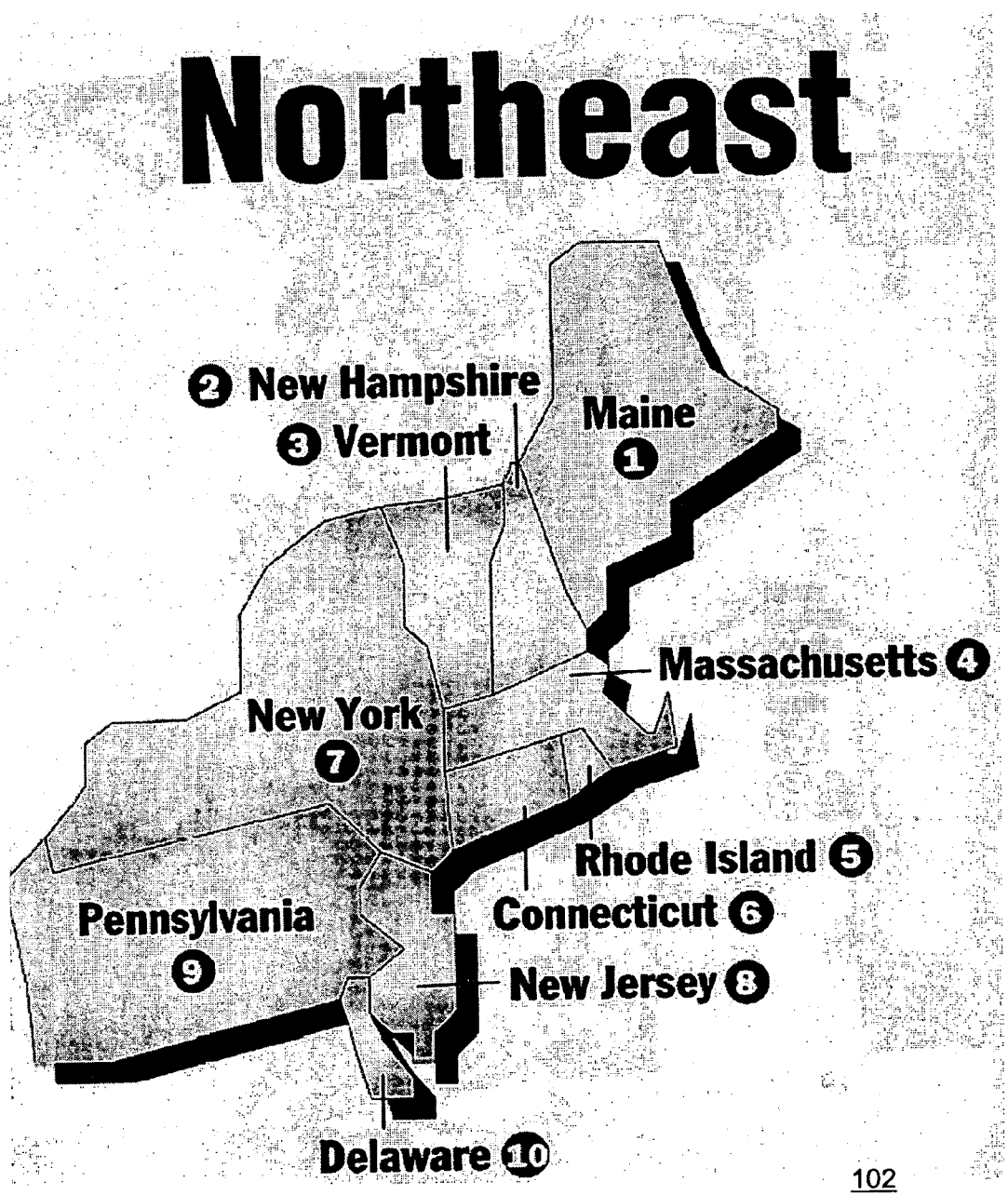
FIG. 2 is a map illustrating the states in the Northeast region of the map of FIG. 1, according to an exemplary embodiment.
Figure 3:
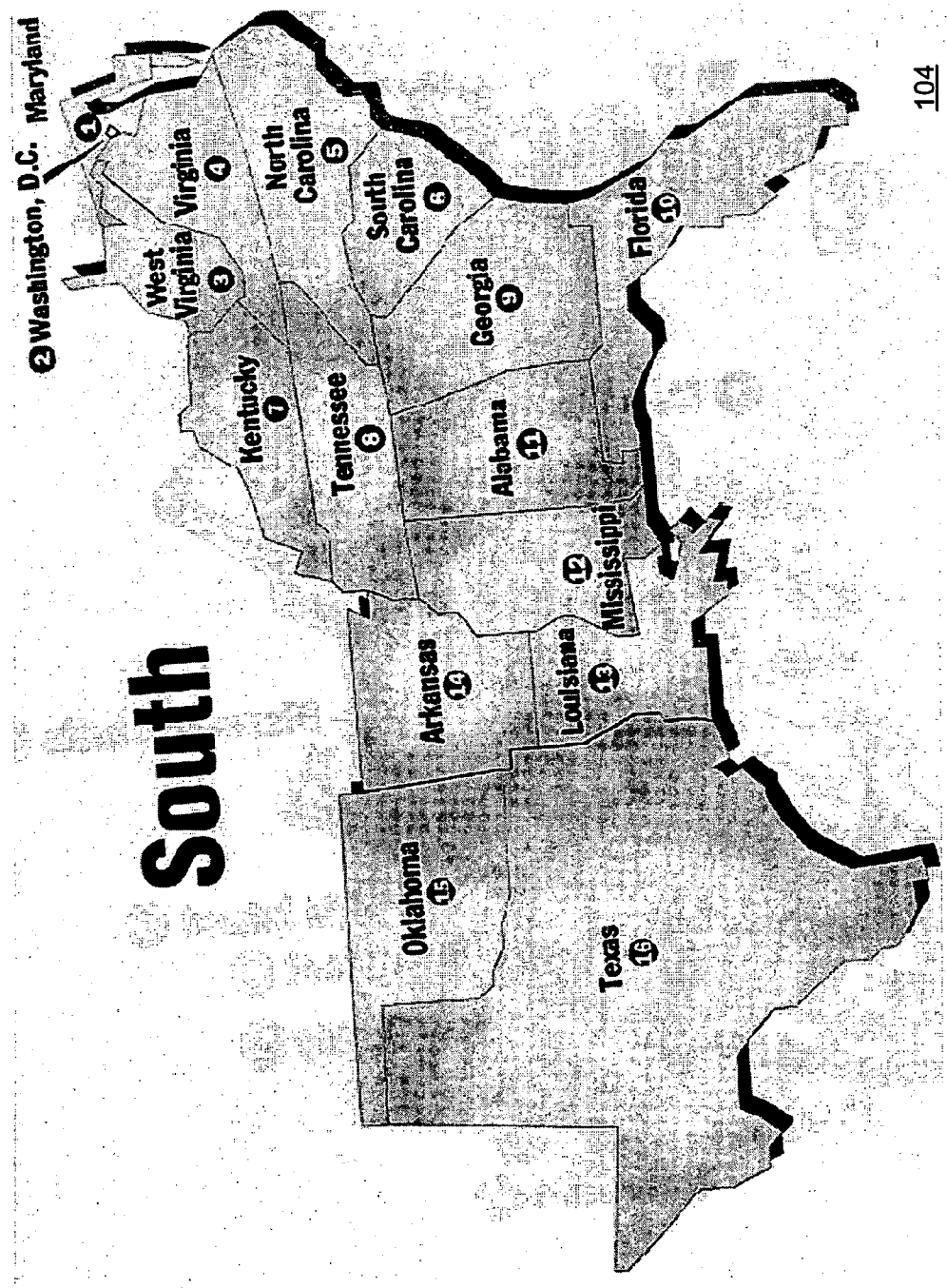
FIG. 3 is a map illustrating the states in the South region of the map of FIG. 1, according to an exemplary embodiment.
Figure 4:
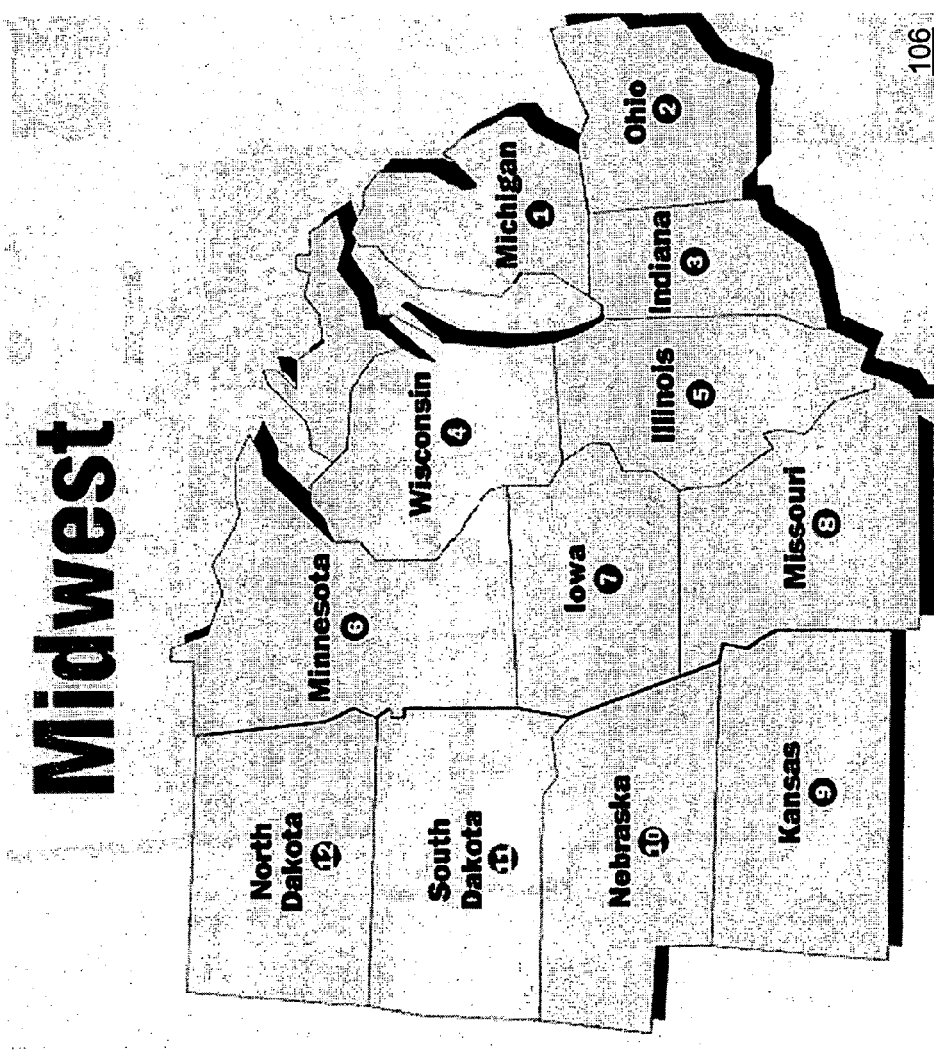
FIG. 4 is a map illustrating the states in the Midwest region of the map of FIG. 1, according to an exemplary embodiment.
Figure 5:
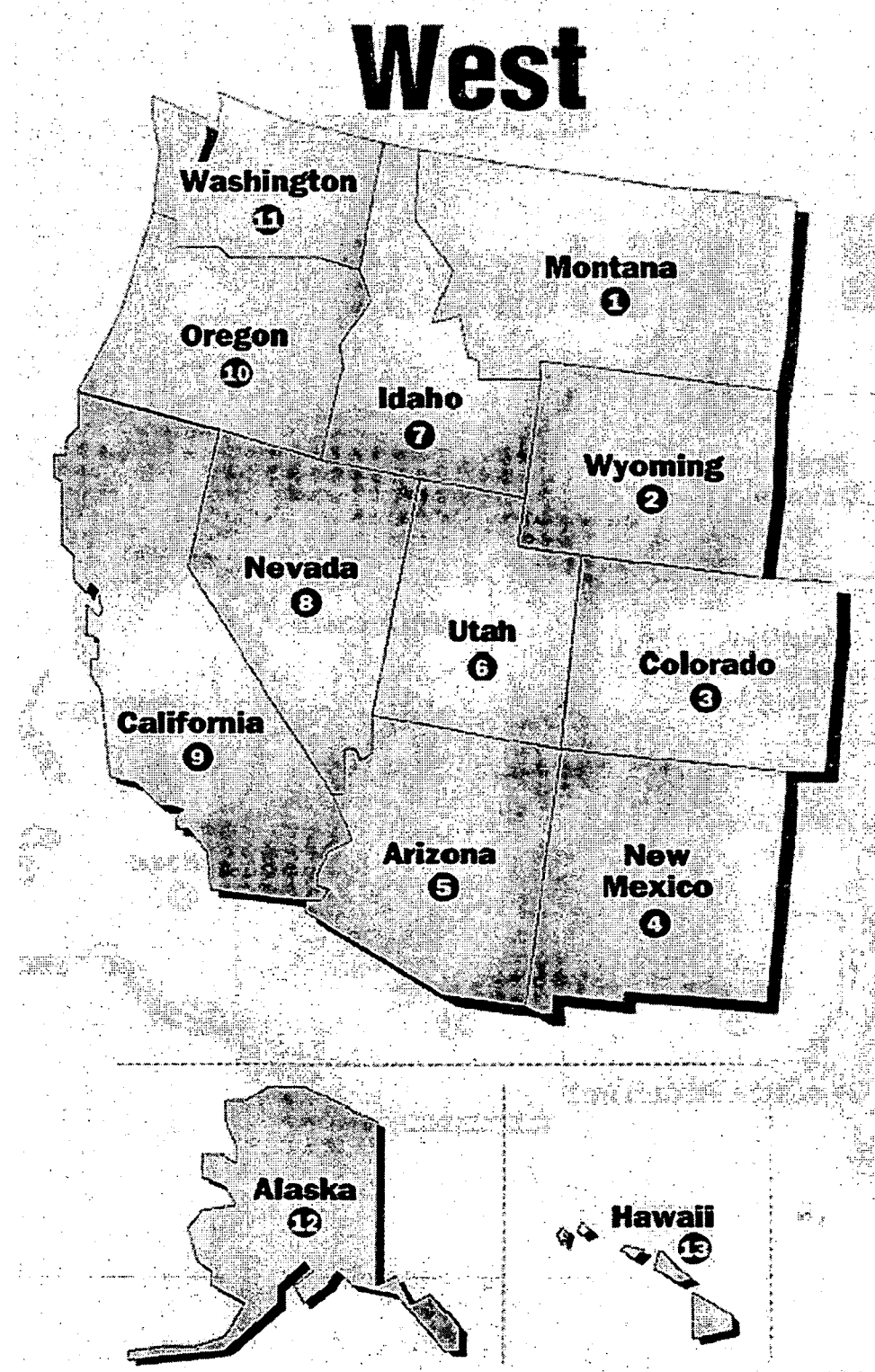
FIG. 5 is a map illustrating the states in the West region of the map of FIG. 1, according to an exemplary embodiment.

The present invention includes recognition that schools should be screened from one other on measurable factors, for example, including the percentage of students who graduate, and the like. A study done between 1997 and 1999 by the U.S. Census Bureau compares the average annual earnings of workers with some college education and those with a college degree. Those with some college education who were working full time earned $36,800 a year while those with a college degree who were working full time earned $52,200. This is a difference of over $15,000 a year. This emphasizes the importance of not just getting into college, but being able to graduate from college.

Typically, conventional systems and methods do not screen schools using both freshman retention rates and graduation rates. While independent college admissions counselors may have the expertise to steer students away from unreliable schools, there is a need to make this information available to a larger portion of the college-applying population, which, even just counting high school seniors in 1999, was over 1.7 million people a year. (See Hunter Breland, et al., *Trends in College Admissions, A Report of a Survey of Undergraduate Admissions Policies, Practices and Procedures* (2002), available on the world wide web (www) atnacac.com/downloads/research_summaryreport-.pdf.

The present invention further includes recognition that that there is a need to set standards that are correlated to the competitiveness of a school. In recent years, at Georgetown University, for example, about 13,000 students apply for admission annually and only 3,000 are accepted. Thus, the students who are accepted are extremely bright and accomplished students. If after the first year, however, 15% of these capable students dropped out or if after six years a total of only 60% of the original freshman class had graduated, this would be inexcusable. If a school with an open admissions policy, on the other hand, has a lower freshman retention or graduation rate, it is more understandable, as there was a much less competitive selection.

Accordingly, several objects and advantages of the exemplary educational institution selection system and method can include getting students thinking about the high-priority factors that will have the biggest impact on their experience in school, generating a manageable list of schools based on preferences of the students within the high-priority factors, providing a list of recommended schools that have been pre-screened, for example, taking into account both freshman retention rates and graduation rates, the selectivity of the school, and the like, and adjusting standards accordingly. The exemplary educational institution selection system and method, advantageously, can be simple, time efficient, and affordably priced, so as to be widely used by a large segment of the population.

In an exemplary embodiment, the educational institution selection system and method can employ various factors in determining a student's prospective school experience, for example, including the location, type/size, and the selectivity of the educational institution. The location of the educational institution typically can be an important factor, as the location can determine the student's distance from home, and homesickness felt by the student, which, incidentally, is one of the main reasons students leave college in their first year. The location also can determine the climate and the type of outdoor activities the student can do, such as skiing or swimming at the beach, and the like. There are also distinctive regional cultural characteristics that could impact on the student's total college experience.

The type and size of the educational institution also can be a key factor that determines educational elements, such as the average size of classes, access to professors, diversity of course offerings, and the like. The type and size factor also can often have a defining impact on the social aspects of the student's experience. The selectivity level of the educational institution also can be extremely important in choosing a college. First and foremost, the selectivity level can indicate the likelihood of acceptance. The selectivity level also can determine the academic pressure once enrolled that a student can expect to experience. For example, if a student barely is accepted into a most selective school that is academically very demanding, such a student may find themselves in the bottom half of the class and not enjoying the pressures of such an environment. Such a student may very well do better at a very selective school, which makes fewer demands and puts less pressure on its students to perform.

The exemplary embodiments can be used to zero in on the above-noted factors, whereas conventional systems and methods typically do not. The exemplary embodiments further generate a manageable list of schools, for example, numbering no fewer than six and no more than twenty-six. An exception can preferably be made, for example, for the Historically Black Colleges and Universities, which can be listed in a single list regardless of region and by state.

The exemplary embodiments further can pre-screen the recommended schools, so as to include schools having a proven track record of keeping and graduating its students. For example, a recommended school is pre-screened for freshman retention rates and graduation rates based on a comprehensive review of the norms and averages of retention and graduation rates at colleges throughout the United States. The rates used to screen the schools can follow a sliding scale according to the selectivity of the school. By contrast, conventional system and methods typically do not employ such an extensive screening process. Advantageously, the exemplary embodiments protect the consumer, the student, and his or her family, from institutions that fail to help students persist in a degree program all the way to graduation.

One of the unexpected results of the exemplary embodiments is that some schools that are widely known and respected regionally and even nationally may be screened out. In the Northeast, for example, Temple University, Adelphi University, and Emerson College did not make the list of recommended schools based on such screening process. In the south, George Mason University, Moorehead State University, and The University of North Carolina at Greensboro did not make the list either. In the Midwest, Indiana University South Bend, Wichita State University, and University of Michigan-Flint were all cut from the list. Lastly, in the West, California State University Bakersfield, San Diego State University, and University of Colorado at Denver, among others, were eliminated from the list. Although such schools are well regarded and competitive, such schools did not have an equally high standard for keeping and graduating their students.

For example, Temple University, to take just one school, which was cut from the list, was nonetheless listed in Antonoff's book, My College Finder, under 22 different topics, such as, "Colleges with Outstanding Music Departments," "Colleges with Fine Women's Studies Programs" and "Colleges with Strong Lacrosse Programs," driving home the distinction between the present invention and conventional systems and methods. Thus, the exemplary educational institution selection system and method can yield completely different results from conventional college recommendation systems and methods. The exemplary embodiments can yield different results than conventional college recommendation systems and methods, for example, because in addition to the student's expressed preference for the specified factors, a given recommend school on the list is determined by explicit standards of adequacy in keeping and graduating its students.

The exemplary embodiments further provide an educational institution selection process that, advantageously, can be performed in a matter of minutes, easing the sense of being overwhelmed that a lot of students feel when they first begin the selection process. In addition, the entire program of the exemplary embodiments can cost less than a fraction of what private counseling costs, making the exemplary educational institution selection system and method accessible to a large segment of the population.

In an exemplary embodiment, the educational institution selection system and method can be configured into parts, for example, in the form of software modules or manuals that can be part of a larger software module or manual set. For example, one module or manual (e.g., called *Find My College in 28 Minutes*) can be configured to focus on factors in selecting an educational institution, such as where the educational institution is located, the type and size of the educational institution, admissions selectivity of the educational institution, and the like. Another module or manual (e.g., called *My College Finder*) can be configured to provide a list of the educational institutions grouped according to possible combinations of the different factors.

Referring now to the drawings, wherein like reference numerals designate identical or corresponding parts throughout the several views, and more particularly to FIG. 1 thereof, there is illustrated a map 100 of the United States of America divided into four regions, according to an exemplary embodiment. In FIG. 1, the *Find My College in 28 Minutes* module or manual, for example, can be configured to allow a student to choose a region in a country, such as the United States, where the student wishes to attend college. In an exemplary embodiment, the United States can be divided into four regions, for example, including a Northeast region 102, a South region 104, a Midwest region 106, and a West region 108. As shown in FIGS. 2–5, each of the four regions 102–104 can include the states that are listed therein for determining educational institutions within a given region.

In an exemplary embodiment, the *Find My College in 28 Minutes* module or manual can be configured to ask the student to choose the type and size of the educational institution the student wishes to attend. For example, educational institutions, such as colleges, universities, and the like, can be broken down into basic types and sizes, including research/large universities, liberal arts colleges, small/medium universities, specialized colleges, schools with special characteristics, community colleges, the top 21 private and public institutions, which are so prestigious and sought after that they constitute a category of their own, and the like.

In an exemplary embodiment, research universities can include universities that emphasize not only undergraduate education, but graduate education as well (e.g., Masters and Doctoral programs, etc.) Large universities can be similar to research universities in that they have big enrollments (e.g., over 10,000 students), but differ in that they have fewer graduate programs (e.g., especially at the Ph.D. level) and little research activity. For example, the large universities can include public universities.

In an exemplary embodiment, liberal arts colleges can include colleges having several hundred to a few thousand students, their main focus being undergraduate education, and carrying a broad range of courses in the arts and sciences. Small/medium universities can include a cross between a large research university and a liberal arts college, and, for example, having between 3,000–6,000 undergraduate students.

In an exemplary embodiment, specialized colleges can include art/music schools, engineering/architectural schools, business schools, health science schools, military schools, trade schools, and the like. Community colleges can include colleges that include two-year schools (e.g., also called junior colleges), colleges that offer two-year associates degree programs, and the like.

In an exemplary embodiment, schools with special characteristics can include historically black colleges and universities, women's colleges, religious schools, and the like. For example, religious schools can include schools that are similar to typical colleges, but require religious observance or a significantly higher than usual number of religion courses needed for graduation.

In an exemplary embodiment, the *Find My College in 28 Minutes* module or manual can be configured to ask the student to decide the most fitting level of selectivity for an educational institution. FIG. 6 illustrates a page or screen 600, including selectivity levels and grade point average (GPA) and scholastic assessment test (SAT) ranges associated with each level, including screening standards used for each selectivity level in terms of percentages of freshman retention and students graduating, according to an exemplary embodiment. In FIG. 6, such selectivity levels, for example, can include most selective 602, very selective 604, selective 606, less selective 608, and the like. The exemplary selectivity levels can be described in terms of GPA and SAT score ranges, as shown in FIG. 6.

In an exemplary embodiment, such standards can be applied in a context-sensitive way, for example, according to region and state. For example, the range of GPA and standardized test scores within a given level of selectivity 602–608 can tend to the higher end of the range in the Northeast region 102, whereas in the South region 104 the range of GPA and standardized test scores within a given level of selectivity 602–608 can tend toward the lower end of the range.

In an exemplary embodiment, the various combinations of the above factors can be indexed. FIG. 7 illustrates a portion of an index page or screen 700 configured for listing possible combinations 702 of selection factors for educational institutions, according to an exemplary embodiment. In FIG. 7, such an index can be configured to refer to links or page numbers 704 in the *My College Finder* module or manual. For example, for the combination 706 (Northeast, Small/Medium Universities, Very Selective), a page 708 or screen from the *My College Finder* module or manual can be accessed, either by accessing the noted page of the *My College Finder* manual directly or by providing a link (e.g., a hyperlink) in the screen 700 thereto.

FIG. 8 illustrates a detailed information page or screen 800 for educational institutions corresponding to the possible combination 706 of selection factors of FIG. 7, according to an exemplary embodiment. In FIG. 8, the page or screen 800 from the *My College Finder* module or manual can be configured to list the names 810, website addresses 804, admissions office addresses 806 and phone numbers 808, and the like, of the schools that fit into the selected category 706. In an exemplary embodiment, the *My College Finder* module or manual can be configured to list each school under the state 810 in which the school is located, and can include an indication 812 of a private or public status of a given school, and selection fields 814 for entering the consideration status (e.g., Yes, Maybe, No, etc.) for a given school by the student.

In an exemplary embodiment, because of the insufficient number of Small/Medium universities, for example, in the South region 104, the West region 108, and the Midwest region 106, the list of the most selective and very selective schools can be combined in such regions. Due to the limited number of Art and Music schools, Engineering and Architecture schools, Women's Colleges and Religious Colleges, a location preference need only be made available for such categories. Due to the even smaller number of Business Colleges, Health Science Colleges, and Military Colleges, such schools can be listed without additional preference options. Historically Black Colleges and Universities also can be given in a single list, as the overwhelming majority of such schools are located in the South region 104.

In an exemplary embodiment, the two-year colleges can be listed with just the location preference. In the *My College Finder* module or manual, however, such schools can be listed not only by state, but also by city, because most students will only go to a two year school that is in the surrounding area and that allows the student to commute from work or home.

In an exemplary embodiment, the criteria to become a recommended school can be based, for example, on pre-screening each school so as to recommend schools with a record of helping students succeed at such institution. In addition, each school can be pre-screened for freshman retention rates and graduation rates. Further, schools can be judged by a standard that is correlated to one of the four competitive levels in which the school can be placed. For example, schools in the selective category 606 can include schools having a freshman drop-out rate of 25% or less and a graduation rate of 55% or more (e.g., after six years). The schools in the most selective category, on the other hand, can include schools having a freshman drop-out rate of 10% or less and graduation rates of 70% or more. FIG. 6 shows the percentages for each selectivity level, according to an exemplary embodiment. For example, after reviewing over 2,000 accredited four-year U.S. colleges and universities, only 900 schools can be recommended based on the above recommendation criteria.

In an exemplary embodiment, there may be schools that are recommended that do not meet the standards shown in FIG. 6 for retention and graduation. Such schools can be included, for example, because there are no other alternatives in a given region, and can be designated with the letter "C" next to such schools in the *My College Finder* module or manual to indicate to the student to apply to such schools with caution.

Figure 9:
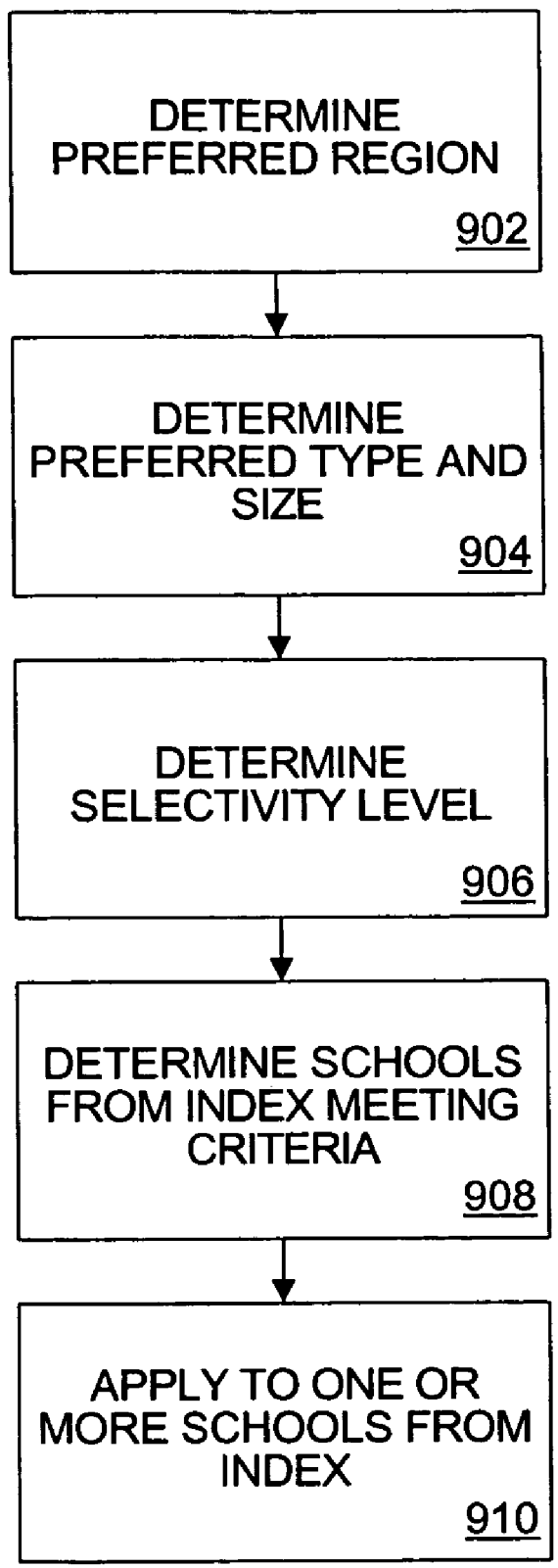
FIG. 9 is a flow chart for illustrating a educational institution selection process, according to an exemplary embodiment.

FIG. 9 is a flow chart for illustrating an educational institution selection process, according to an exemplary embodiment. In an exemplary embodiment, the educational institution selection system and method can be configured as an interactive system. For example, at step 902, starting with the *Find My College in 28 Minutes* module or manual, a student can choose a preferable region from the regions 102–108 for selecting one or more educational institutions to apply. At step 904, the student can choose a preference for type and size of educational institution, for example, after being provided with a clear and simple explanation of the various options. At step 906, the student can choose one of the selectivity levels 602–608 that are most appropriate to grades and test scores of the student. In a further exemplary embodiment, the *Find My College in 28 Minutes* module can be configured to automatically select one of the selectivity levels 602–608 based on grades and test scores entered by the student.

At step 908, after determining a preference for the above-noted areas, the student can refer or be linked to the index page or screen 700 from the *Find My College in 28 Minutes* module or manual. The index page or screen 700 then can be used to refer or link to the pages or screens 800 from the *My College Finder* module or manual, which can list the groupings of schools that fit the specified criteria, according to the corresponding state. At step 910, the student can use the information from the pages or screens 800 to apply at one or more of the recommended schools.

In an exemplary embodiment, the educational institution selection process of FIG. 9 can be repeated over and over by the same student using different preferences, for example, when a student is not sure about location, type or size, and/or selectivity criteria. In a further exemplary embodiment, the educational institution selection system and method can be configured to automate the process for applying to one or more of the recommended schools.

In an exemplary embodiment, for example, if a student wanted to consider schools that are in the Northeast, that are Small/Medium universities, and that are very selective, the index page or screen 700 can be configured to direct the student to page 16 or screen 800 of the *My College Finder* module or manual, where the student can find a list of schools (e.g., ten) that are recommended. As shown in FIG. 8, for example, under Massachusetts, Brandeis University can be listed, under Connecticut, Fairfield University can be listed, under New York, Clarkson University, Ithaca College, Marist College and State University of New York College at Geneseo can be listed, under New Jersey, Drew University, and Richard Stockton College of New Jersey can be listed, under Pennsylvania, St. Joseph's University, and University of Scranton can be listed, and the like.

The exemplary embodiments, advantageously, provide a novel system and method for making the best choice in selecting an educational institution. The exemplary embodiments focus on various factors when choosing a college or university, for example, including location, the type of school (e.g., ranging from small college to large research university), the admissions selectivity of a school, and the like. Such factors and the possible combinations thereof then can be used to generate a list of recommended schools that satisfy such criteria. In addition, each of the recommended schools can be pre-screened to include schools with a record of helping students succeed, for example, based on freshman retention rates and graduation rates.

In an exemplary embodiment, a sliding scale standard can be employed for the freshman retention rates and graduation rates, for example, according to the selectivity of the school. For example, for schools that have higher admissions standards, such schools can be required for school recommendation to have proportionately higher standards of freshman retention rates and graduation rates. Likewise, for schools with lower admissions standards, the freshman retention and graduation rates required for school recommendation can be correspondingly lower.

Figure 10:
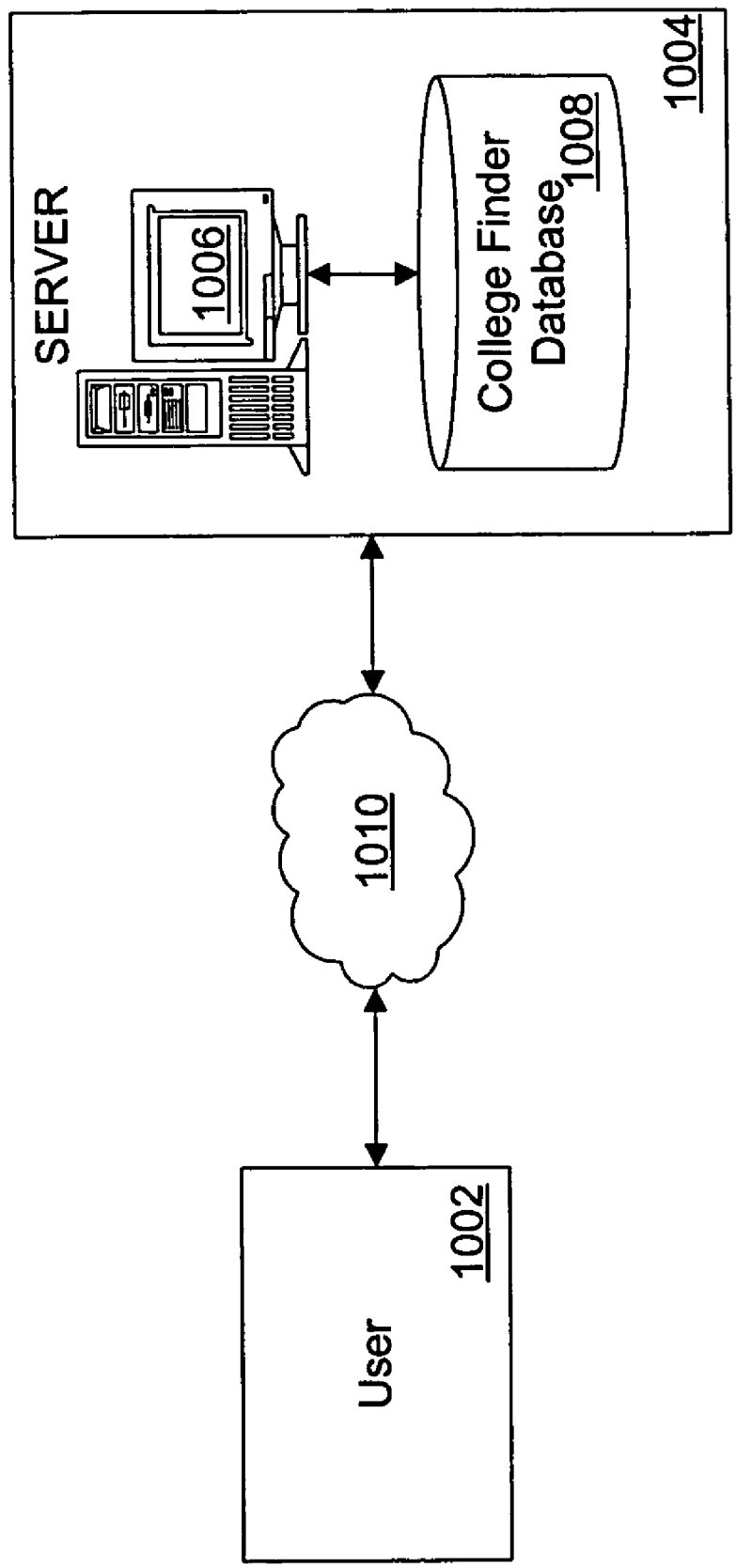
FIG. 10 illustrates an exemplary system that can be configured to perform the exemplary educational institution selection processes of FIGS. 1–9.

FIG. 10 illustrates an exemplary system 1000 that can be configured to perform the exemplary educational institution selection process of FIGS. 1–9. In FIG. 10, the exemplary system 1000, for example, can include one or more user devices 1002 coupled over a communications network 1010 to a computer system, such as server 1004, and the like. The server 1004 can include a computer 1006 and a college finder database 1008, for example, for storing the educational institution information, and the like, employed by the exemplary educational institution selection process. Students can connect, via the user devices 1002, over the communications network 1010, such as the Internet, to the server 1004, which can be configured to perform the exemplary educational institution selection process of FIGS. 1–9 by accessing the college finder database 1008 and displaying the exemplary pages or screens on a web browser of the user devices 1002. In further exemplary embodiments, the functions performed by the server 1004 and the college finder database 1008 can be implemented, for example, as stand-alone windows software running on the user devices 1002, as will be appreciated by those skilled in the relevant art(s).

The above-described devices and subsystems of the exemplary embodiments of FIGS. 1–10 can include, for example, any suitable servers, workstations, Personal Computers (PCs), laptop computers, Personal Digital Assistants (PDAs), Internet appliances, handheld devices, cellular telephones, wireless devices, other devices, etc., capable of performing the processes of the exemplary embodiments. The devices and subsystems can communicate with each other using any suitable protocol and can be implemented, for example, using the computer system 1100 of FIG. 11. The devices and subsystems of the exemplary embodiments of FIGS. 1–10 can communicate with each other over a communications network, such as the communications network 1010, such as the Internet, an intranet, a local area network (LAN), and the like.

One or more interface mechanisms can be used in the exemplary embodiments of FIGS. 1–10 including, for example, Internet access, telecommunications in any suitable form, for example, voice, modem, wireless communications media, and the like. Accordingly, the communications network 1010 employed in the exemplary embodiments of FIGS. 1–10 can include, for example, one or more wired or wireless communications networks, cellular communications networks, G3 communications networks, Public Switched Telephone Network (PSTNs), Packet Data Networks (PDNs), the Internet, intranets, and/or combination thereof, and the like.

It is to be understood that the exemplary embodiments of FIGS. 1–10 are for exemplary purposes, as many variations of the specific hardware and software used to implement the described embodiments are possible, as can be appreciated by those skilled in the relevant art(s). For example, the functionality of the devices and the subsystems of the exemplary embodiments of FIGS. 1–10 can be implemented via one or more programmed computer systems or devices.

To implement such variations as well as other variations, a single computer system (e.g., the computer system 1100 of FIG. 11) can be programmed to perform the special purpose functions of one or more of the devices and subsystems of the exemplary embodiments of FIGS. 1–10. On the other hand, two or more programmed computer systems or devices can be substituted for any one of the devices and subsystems of the exemplary embodiments of FIGS. 1–10. Accordingly, principles and advantages of distributed processing, such as redundancy, replication, etc., also can be implemented, as desired, for example, to increase the robustness and performance of the exemplary embodiments of FIGS. 1–10.

The exemplary embodiments of FIGS. 1–10 can store information relating to various exemplary processes described herein. This information can be stored in one or more memories, such as a hard disk, optical disk, magneto-optical disk, RAM, and the like, of the devices of the exemplary embodiments of FIGS. 1–10. One or more databases of the devices and subsystems of the exemplary embodiments of FIGS. 1–10, such as the spectra database 208, and the like, can store the information used to implement the exemplary embodiments of the present invention. The databases can be organized using data structures (e.g., records, tables, arrays, fields, graphs, trees, and/or lists) included in one or more memories, such as the memories listed above or any suitable storage devices, such as the storage devices listed below in the discussion of FIG. 11, and the like.

The exemplary embodiments of FIGS. 1–10 can include appropriate data structures for storing data collected and/or generated in one or more databases thereof, such as the college finder database 1008, and the like. Such data structures, accordingly, can include fields for storing such collected and/or generated data. In a database management system, data can be stored in one or more data containers, each container including records, and the data within each record can be organized into one or more fields. In relational database systems, the data containers can be referred to as tables, the records can be referred to as rows, and the fields can be referred to as columns. In object-oriented databases, the data containers can be referred to as object classes, the records can be referred to as objects, and the fields can be referred to as attributes. Other database architectures can be employed and use other terminology. Systems that implement the exemplary embodiments of the present invention are not limited to any particular type of data container or database architecture.

All or a portion of the exemplary embodiments of FIGS. 1–10 can be conveniently implemented using one or more conventional general purpose computer systems, microprocessors, digital signal processors, micro-controllers, and the like, programmed according to the teachings of the embodiments of the present invention (e.g., using the computer system of FIG. 11), as can be appreciated by those skilled in the computer and software art(s). Appropriate software can be readily prepared by programmers of ordinary skill based on the teachings of the present disclosure, as can be appreciated by those skilled in the software art. Further, the exemplary embodiments of FIGS. 1–10 can be implemented on the World Wide Web (e.g., using the computer system of FIG. 1). In addition, the exemplary embodiments of FIGS. 1–10 can be implemented by the preparation of application-specific integrated circuits or by interconnecting an appropriate network of conventional component circuits, as can be appreciated by those skilled in the electrical art(s).

Figure 11:
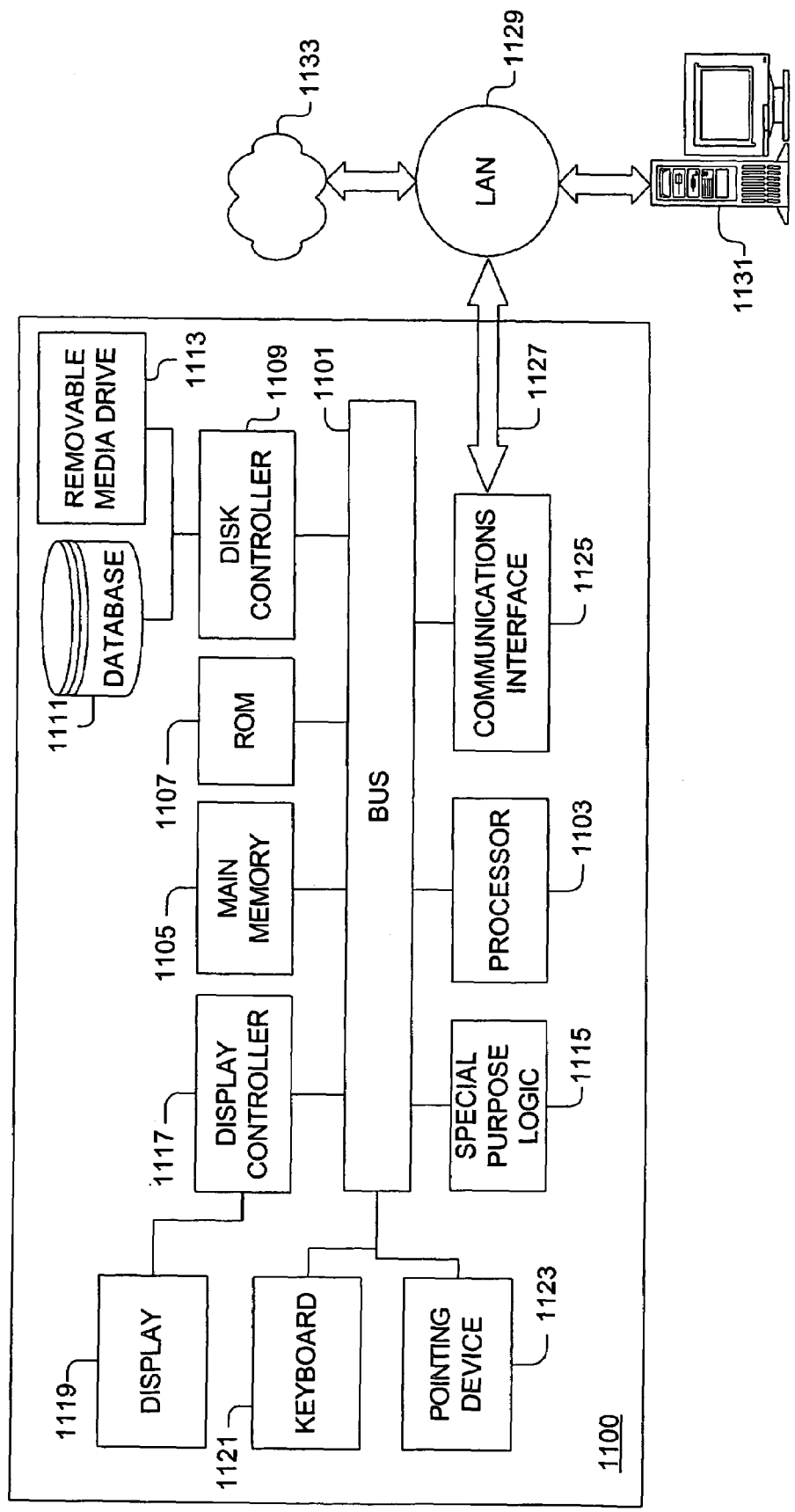
FIG. 11 illustrates an exemplary computer system, which can be programmed to perform one or more of the processes of the described exemplary embodiments.

FIG. 11 illustrates a computer system 1100 upon which the exemplary embodiments (e.g., the devices and subsystems of the exemplary embodiments of FIGS. 1–10) can be implemented. The various embodiments can be implemented on a single such computer system, or a collection of multiple such computer systems. The computer system 1100 can include a bus 1101 or other communication mechanism for communicating information, and a processor 1103 coupled to the bus 1101 for processing the information. The computer system 1100 also can include a main memory 1105, such as a random access memory (RAM), other dynamic storage device (e.g., dynamic RAM (DRAM), static RAM (SRAM), synchronous DRAM (SDRAM)), etc., coupled to the bus 1101 for storing information and instructions to be executed by the processor 1103.

In addition, the main memory 1105 also can be used for storing temporary variables or other intermediate information during the execution of instructions by the processor 1103. The computer system 1100 further can include a ROM 1107 or other static storage device (e.g., programmable ROM (PROM), erasable PROM (EPROM), electrically erasable PROM (EEPROM), etc.) coupled to the bus 1101 for storing static information and instructions.

The computer system 1100 also can include a disk controller 1109 coupled to the bus 1101 to control one or more storage devices for storing information and instructions, such as a magnetic hard disk 1111, and a removable media drive 1113 (e.g., floppy disk drive, read-only compact disc drive, read/write compact disc drive, compact disc jukebox, tape drive, and removable magneto-optical drive). The storage devices can be added to the computer system 1100 using an appropriate device interface (e.g., small computer system interface (SCSI), integrated device electronics (IDE), enhanced-IDE (E-IDE), direct memory access (DMA), or ultra-DMA).

The computer system 1100 also can include special purpose logic devices 1115, such as application specific integrated circuits (ASICs), full custom chips, configurable logic devices, e.g., simple programmable logic devices (SPLDs), complex programmable logic devices (CPLDs), field programmable gate arrays (FPGAs), and the like, for performing special processing functions, such as signal processing, image processing, speech processing, optical character recognition (OCR), voice recognition, text-to-speech and speech-to-text processing, communications functions, educational institution indexing functions, educational institution selectivity functions, educational institution geographical mapping and selection functions, educational institution user input functions, and the like.

The computer system 1100 also can include a display controller 1117 coupled to the bus 1101 to control a display 1119, such as a cathode ray tube (CRT), liquid crystal display (LCD), television display, active matrix display, plasma display, touch display, and the like, for displaying or conveying information to a computer user. The computer system can include input devices, such as a keyboard 1121 including alphanumeric and other keys and a pointing device 1123, for interacting with a computer user and providing information to the processor 1103. The pointing device 1123 can include, for example, a mouse, a trackball, a pointing stick, etc. or voice recognition processor, etc., for communicating direction information and command selections to the processor 1103 and for controlling cursor movement on the display 1119. In addition, a printer can provide printed listings of the data structures/information of the exemplary embodiments of FIGS. 1–10 or any other data stored and/or generated by the computer system 1100.

The computer system 1100 can perform all or a portion of the processing steps of the invention in response to the processor 1103 executing one or more sequences of one or more instructions contained in a memory, such as the main memory 1105. Such instructions can be read into the main memory 1105 from another computer readable medium, such as the hard disk 1111 or the removable media drive 1113. Execution of the arrangement of instructions contained in the main memory 1105 causes the processor 1103 to perform the process steps described herein. One or more processors in a multi-processing arrangement also can be employed to execute the sequences of instructions contained in the main memory 1105. In alternative embodiments, hard-wired circuitry can be used in place of or in combination with software instructions. Thus, embodiments are not limited to any specific combination of hardware circuitry and/or software.

Stored on any one or on a combination of computer readable media, the embodiments of the present invention can include software for controlling the computer system 1100, for driving a device or devices for implementing the invention, and for enabling the computer system 1100 to interact with a human user (e.g., users of the exemplary embodiments of FIGS. 1–10, etc.). Such software can include, but is not limited to, device drivers, firmware, operating systems, development tools, applications software, etc. Such computer readable media further can include the computer program product of an embodiment of the present invention for performing all or a portion (if processing is distributed) of the processing performed in implementing the invention. Computer code devices of the embodiments of the present invention can include any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the embodiments of the present invention can be distributed for better performance, reliability, and/or cost.

The computer system 1100 also can include a communication interface 1125 coupled to the bus 1101. The communication interface 1125 can provide a two-way data communication coupling to a network link 1127 that is connected to, for example, a LAN 1129, or to another communications network 1133 (e.g., a wide area network (WAN), a global packet data communication network, such as the Internet, etc.). For example, the communication interface 1125 can include a digital subscriber line (DSL) card or modem, an integrated services digital network (ISDN) card, a cable modem, a telephone modem, etc., to provide a data communication connection to a corresponding type of telephone line. As another example, the communication interface 1125 can include a local area network (LAN) card (e.g., for Ethernet™, an Asynchronous Transfer Model (ATM) network, etc.), etc., to provide a data communication connection to a compatible LAN. Wireless links also can be implemented. In any such implementation, the communication interface 1125 can send and receive electrical, electromagnetic, or optical signals that carry digital data streams representing various types of information. Further, the communication interface 1125 can include peripheral interface devices, such as a Universal Serial Bus (USB) interface, a PCMCIA (Personal Computer Memory Card International Association) interface, etc.

The network link 1127 typically can provide data communication through one or more networks to other data devices. For example, the network link 1127 can provide a connection through the LAN 1129 to a host computer 1131, which has connectivity to the network 1133 or to data equipment operated by a service provider. The LAN 1129 and the network 1133 both can employ electrical, electromagnetic, or optical signals to convey information and instructions. The signals through the various networks and the signals on the network link 1127 and through the communication interface 1125, which communicate digital data with computer system 1100, are exemplary forms of carrier waves bearing the information and instructions.

The computer system 1100 can send messages and receive data, including program code, through the network 1129 and/or 1133, the network link 1127, and the communication interface 1125. In the Internet example, a server can transmit requested code belonging to an application program for implementing an embodiment of the present invention through the network 1133, the LAN 1129 and the communication interface 1125. The processor 1103 can execute the transmitted code while being received and/or store the code in the storage devices 1111 or 1113, or other non-volatile storage for later execution. In this manner, computer system 1100 can obtain application code in the form of a carrier wave. With the system of FIG. 11, the embodiments of the present invention can be implemented on the Internet as a Web Server 1100 performing one or more of the processes according to the embodiments of the present invention for one or more computers coupled to the Web server 1100 through the network 1133 coupled to the network link 1127.

The term computer readable medium as used herein can refer to any medium that participates in providing instructions to the processor 1103 for execution. Such a medium can take many forms, including but not limited to, non-volatile media, volatile media, transmission media, etc. Non-volatile media can include, for example, optical or magnetic disks, magneto-optical disks, etc., such as the hard disk 1111 or the removable media drive 1113. Volatile media can include dynamic memory, etc., such as the main memory 1105. Transmission media can include coaxial cables, copper wire and fiber optics, including the wires that make up the bus 1101. Transmission media also can take the form of acoustic, optical, or electromagnetic waves, such as those generated during radio frequency (RF) and infrared (IR) data communications.

As stated above, the computer system 1100 can include at least one computer readable medium or memory for holding instructions programmed according to the teachings of the invention and for containing data structures, tables, records, or other data described herein. Common forms of computer-readable media can include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the embodiments of the present invention can initially be borne on a magnetic disk of a remote computer connected to either of the networks 1129 and 1133. In such a scenario, the remote computer can load the instructions into main memory and send the instructions, for example, over a telephone line using a modem. A modem of a local computer system can receive the data on the telephone line and use an infrared transmitter to convert the data to an infrared signal and transmit the infrared signal to a portable computing device, such as a PDA, a laptop, an Internet appliance, etc. An infrared detector on the portable computing device can receive the information and instructions borne by the infrared signal and place the data on a bus. The bus can convey the data to main memory, from which a processor retrieves and executes the instructions. The instructions received by main memory can optionally be stored on storage device either before or after execution by processor.

Although the exemplary educational institution selection process is described in terms of employing the three exemplary factors and proceeding in the order of location, then type and size, and then selectivity, the exemplary process can be ordered in any suitable manner that provides similar effectiveness, as will be appreciated by those skilled in the relevant art(s).

Although the exemplary educational institution selection system and method is described in terms of selecting colleges, the exemplary embodiments also can be adapted to assist students in the selection of other types of educational institutions, as will be appreciated by those skilled in the relevant art(s).

Although the exemplary educational institution selection system and method is described in terms of selecting educational institutions in the United States, the exemplary embodiments also can be adapted to assist students in the selection of educational institutions in other countries, as will be appreciated by those skilled in the relevant art(s).

While the present invention have been described in connection with a number of exemplary embodiments and implementations, the present invention is not so limited but rather covers various modifications and equivalent arrangements, which fall within the purview of the appended claims.

What is claimed is:

1. A method for selecting an educational institution, comprising:
   inputting by a user selection criteria for an educational institution, the selection criteria including a location of the educational institution, a type and size of the educational institution, a grade point average of the user, and a standardized test score of the user;
   determining an admission selectivity of the educational institution based on a sliding scale standard for freshman retention rates and graduation rates, the sliding scale requiring proportionately higher standards for the freshman retention rates and the graduation rates for an educational institution having higher admissions standards, and requiring proportionately lower standards for the freshman retention rates and the graduation rates for an educational institution having lower admissions standards; and
   generating a list of one or more recommended schools for the user based on the selection criteria, and the determined admission selectivity.

2. The method of claim 1, wherein said method is employed to make a best choice in selecting an educational institution.

3. The method of claim 1, wherein the location includes one of a northeast region, a south region, a midwest region, and a west region of the United States.

4. The method of claim 1, wherein the type and size of the educational institution can include research or large universities, liberal arts colleges, small or medium universities, specialized colleges, schools with special characteristics, community colleges, and top 21 private and public institutions.

5. A system for selecting an educational institution, comprising:
   means for inputting by a user selection criteria for an educational institution, the selection criteria including a location of the educational institution, a type and size of the educational institution, a grade point average of the user, and a standardized test score of the user;
   means for determining an admission selectivity of the educational institution based on a sliding scale standard for freshman retention rates and graduation rates, the sliding scale requiring proportionately higher standards for the freshman retention rates and the graduation rates for an educational institution having higher admissions standards, and requiring proportionately lower standards for the freshman retention rates and the graduation rates for an educational institution having lower admissions standards: and
   means for generating a list of one or more recommended schools for the user based on the selection criteria, and the determined admission selectivity.

6. The system of claim 5, wherein said system is employed to make a best choice in selecting an educational institution.

7. The system of claim 5, wherein the location includes one of a northeast region, a south region, a midwest region, and a west region of the United States.

8. The system of claim 5, wherein the type and size of the educational institution can include research or large universities, liberal arts colleges, small or medium universities, specialized colleges, schools with special characteristics, community colleges, and top 21 private and public institutions.

9. The system of claim 5, wherein the means for inputting, the means for determining and the means for generating comprise devices of a computer system.

10. The system of claim 5, wherein the means for inputting, the means for determining and the means for generating comprise computer-readable instructions stored on a computer readable medium.

11. A system for selecting an educational institution, comprising:
    a computer program product for inputting by a user selection criteria for an educational institution, the selection criteria including a location of the educational institution, a type and size of the educational institution, a grade point average of the user, and a standardized test score of the user;
    the computer program product for determining an admission selectivity of the educational institution based on a sliding scale standard for freshman retention rates and graduation rates, the sliding scale requiring proportionately higher standards for the freshman retention rates and the graduation rates for an educational institution having higher admissions standards, and requiring proportionately lower standards for the freshman retention rates and the graduation rates for an educational institution having lower admissions standards; and
    the computer program product for generating a list of one or more recommended schools for the user based on the selection criteria, and the determined admission selectivity.

12. The system of claim 11, wherein said system is employed to make a best choice in selecting an educational institution.

13. The system of claim 11, wherein the location includes one of a northeast region, a south region, a midwest region, and a west region of the United States.

14. The system of claim 11, wherein the type and size of the educational institution can include research or large universities, liberal arts colleges, small or medium universities, specialized colleges, schools with special characteristics, community colleges, and top 21 private and public institutions.

* * * * *